(12) United States Patent
Nishijima et al.

(10) Patent No.: US 8,051,938 B2
(45) Date of Patent: Nov. 8, 2011

(54) SEAT MOUNTING STRUCTURE FOR MOTORCYCLE, AND MOTORCYCLE INCORPORATING SAME

(75) Inventors: Tomoki Nishijima, Saitama (JP); Noriyoshi Tsutsui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 12/287,879

(22) Filed: Oct. 14, 2008

(65) Prior Publication Data

US 2009/0114466 A1 May 7, 2009

(30) Foreign Application Priority Data

Nov. 2, 2007 (JP) ................................. 2007-286422

(51) Int. Cl.
*B62J 1/08* (2006.01)
*B62K 11/02* (2006.01)

(52) U.S. Cl. ..................... 180/219; 280/304.5; 293/105; 297/195.1

(58) Field of Classification Search .................. 180/219, 180/311; 280/304.5, 281.1; 197/195.1; 297/195.1, 297/215.16; 293/105
See application file for complete search history.

(56) References Cited

U.S. PATENT DOCUMENTS

| | | | | |
|---|---|---|---|---|
| 5,533,783 A | * | 7/1996 | Harms et al. | 297/195.13 |
| 7,520,359 B2 | * | 4/2009 | Iwanaga | 180/219 |
| 2006/0066092 A1 | * | 3/2006 | Miyabe | 280/833 |
| 2008/0169134 A1 | * | 7/2008 | Tomolillo et al. | 180/6.24 |
| 2008/0277980 A1 | | 11/2008 | Koda et al. | |

FOREIGN PATENT DOCUMENTS

| | | | |
|---|---|---|---|
| EP | 1 550 605 A1 | | 7/2005 |
| EP | 1 964 759 A1 | | 9/2008 |
| JP | 1-247288 | * | 10/1989 |
| JP | 3-104793 | * | 5/1991 |
| JP | 3-266785 | * | 11/1991 |
| JP | 2706956 | | 10/1997 |
| JP | 2007-055283 A | | 3/2007 |
| JP | 2007-099084 A | | 4/2007 |

* cited by examiner

*Primary Examiner* — Anne Marie Boehler
(74) *Attorney, Agent, or Firm* — Carrier Blackman & Associates, P.C.; Joseph P. Carrier; William D. Blackman (57) ABSTRACT

A seat mounting structure having a seat rail for supporting a seat of a motorcycle includes seat rail members having front end portions thereof supported by an intermediate portion of a vehicle body frame. Each of the seat rail members extends rearwardly from the intermediate portion of the vehicle body frame. Each of the seat rail members has a slotted opening formed thereon at a rear portion thereof. The slotted openings are formed inwardly and upwardly from an outer portion of the seat rail members in a vehicle width direction.

17 Claims, 10 Drawing Sheets

SEAT MOUNTING STRUCTURE FOR MOTORCYCLE, AND MOTORCYCLE INCORPORATING SAME

CROSS-REFERENCE TO RELATED APPLICATIONS

The present application claims priority under 35 USC §119 based on Japanese patent application No. 2007-286422, filed on Nov. 2, 2007. The entire subject matter of this priority document is incorporated by reference herein.

BACKGROUND OF THE INVENTION

1. Field of the Invention

The present invention relates to a seat mounting structure for a motorcycle, and to a motorcycle incorporating same. More particularly, the present invention relates to seat mounting structure including a seat rail having a slotted opening formed therein.

2. Description of the Background Art

There are several known seat mounting structures having seat rail members supporting a seat of a motorcycle. The seat rail is provided at a rearward portion of a vehicle (motorcycle) body, and is configured to support a seat thereon. The seat rail is extended rearwardly from a rear of a main frame of the motorcycle. The main frame forms a front half of the body of the motorcycle. The seat rail generally includes right and left seat rail members.

An example of such known seat mounting structure for a motorcycle is disclosed in Japanese Patent document JP 2706956.

According to Japanese Patent document JP 2706956, a seat frame for motorcycle includes a right and left seat frames. Each of the right and left seat frames has a grip 9, for securing a hand of a user, provided on rear side portions thereof. The grip 9 protrudes downwardly, and portions thereof which are open upwardly and each section of U-shaped grips 9 are integrated with rear halves of the left and right seat frames 5, 6 with the portions thereof protruding sidewardly (see FIGS. 1 and 4 of the Japanese Patent document JP Patent No. 2706956).

The grips of the seat frames of the Japanese Patent document JP Patent No. 2706956, have problems because: they protrude on both sides of the seat frames; width between the seat frames may be widened since they are U-shaped and are directed upwardly; the semi-cylindrical outside faces each section swollen downwardly are gripped when a passenger seating on the rear of the seat grasps the grips, and accordingly, it is difficult to grasp the grips. Also, when the sides of the grips are covered with a rear fender and a rear cowl because of appearance, the difficulty of grasping the grips is increased.

The present invention has been made to overcome such drawbacks. Accordingly, it is one of the objects of the present invention to provide a seat mounting structure for a motorcycle having seat rail members which can be easily and securely grasped when a portion for securing a hand is provided to right and left seat rail members, in which an increase of vehicle width is restricted (inhibited) even if the portion for securing a hand is provided, and in which the appearance quality can be satisfactorily held while providing the portion for securing the seat rail members by user's hands.

SUMMARY OF THE INVENTION

In order to achieve the above objects, the present invention according to a first aspect thereof provides a seat mounting structure for a motorcycle having a seat rail, in which a front end portion of the seat rail is supported by an intermediate portion of a vehicle body frame of the motorcycle, and in which the seat rail is extended rearwardly from the intermediate portion of the vehicle body frame. The present invention is characterized in that a slotted opening is provided at a rear portion of the seat rail inwardly and upwardly from an outer portion thereof in a vehicle width direction.

The present invention according to a second aspect thereof, in addition to the first aspect, is characterized in that the seat rail includes right and left seat rail members. A rear fender separately formed between the right and left seat rail members is supported by each of the seat members. Each of the convex portions formed on the rear fender protrudes towards respective one of the slotted openings of the seat rail members. A shape of the convex portions of the rear fender corresponds to respective slotted opening of the seat rail members.

The present invention according to a third aspect thereof, in addition the second aspect, is characterized in that the rear fender includes a rear cowl, and when viewed in a side view, the slotted openings of the seat rail members are covered with the rear cowl.

The present invention according to a fourth aspect thereof, in addition the second aspect, is characterized in that, when viewed in a top view, each of the slotted openings of the seat rail members is substantially elliptical-shaped, and each of the convex portions of the rear fender surrounds respective one of the elliptical-shaped slotted openings of the seat rail members.

EFFECTS OF THE INVENTION

In the present invention as disclosed the first aspect thereof—since the slotted openings are provided to the rear of the seat rail members, and the slotted openings are formed inwardly and upwardly from the outside in a vehicle width direction, fingers are inserted into the slotted opening directed upwardly when a passenger grasps the slotted opening for securing a hand, the inner surface of the slotted opening and the outside portions in the slotted opening of the seat rail member hit cushions of the passenger's fingers and the passenger's palm outside the slotted opening—the slotted opening can be easily and securely grasped.

The slotted opening is provided on the rear of the seat rail member inwardly and upwardly from the outside in the vehicle width direction, the portion of the seat rail member for securing a hand is not protruded outwardly. Accordingly, a dimension in the direction of the width of the right and left seat rail members can be restricted (inhibited). Also, since the seat rail member has no portion protruding sidewardly, a satisfactory appearance quality of the seat rail can be achieved.

In the present invention as disclosed in the second aspect thereof—since the rear fender separately formed between the right and left seat rail members is supported by the seat rail members and the convex portion protruding towards the slotted opening of each of the seat rail members corresponds to the slotted opening of the rear fender, the convex portion of the rear fender provided between the right and left seat rail members is fitted to the slotted opening of the seat rail, the rear fender is normally made of resin, and the slotted opening for securing a hand is made of resin—when the slotted opening is grasped for securing a hand, a feel of a grasp is satisfactory. Also, the slotted opening of the seat rail member in combination with the convex portion of the rear fender provides a grasping component which is easy to grasp for securing a hand.

In the present invention as disclosed in the third aspect thereof, since the slotted opening of the seat rail member is covered with the rear cowl from the outside, when viewed in a side view, the grasping component for securing a hand formed by the slotted opening of the rear of the seat rail and the convex portion of the rear fender is concealed from the outside. Further, since the side of the rear of the rear cowl is exposed in this grasping component, a satisfactory appearance quality of the seat rail members is achieved.

In the present invention as disclosed in the fourth aspect thereof, since the slotted opening of each of the seat rail members has substantially elliptical shape, when viewed in a top view, and since the convex portion of the rear fender surrounds the slotted opening, the whole circumference of the grasping component for securing a hand is surrounded, the whole circumferences of fingers and a palm are surrounded, and the portion for securing a hand can be easily and more securely grasped.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

An illustrative embodiment of the present invention is described below with reference to the attached drawings. In the drawings, Fr denotes a front side of the vehicle (a front traveling direction of a vehicle), Rr denotes the rear direction opposite to the front traveling direction, R denotes the right side based upon a rider's position, while normally operating the vehicle, and L denotes the left side based upon the rider's position.

Figure 1:
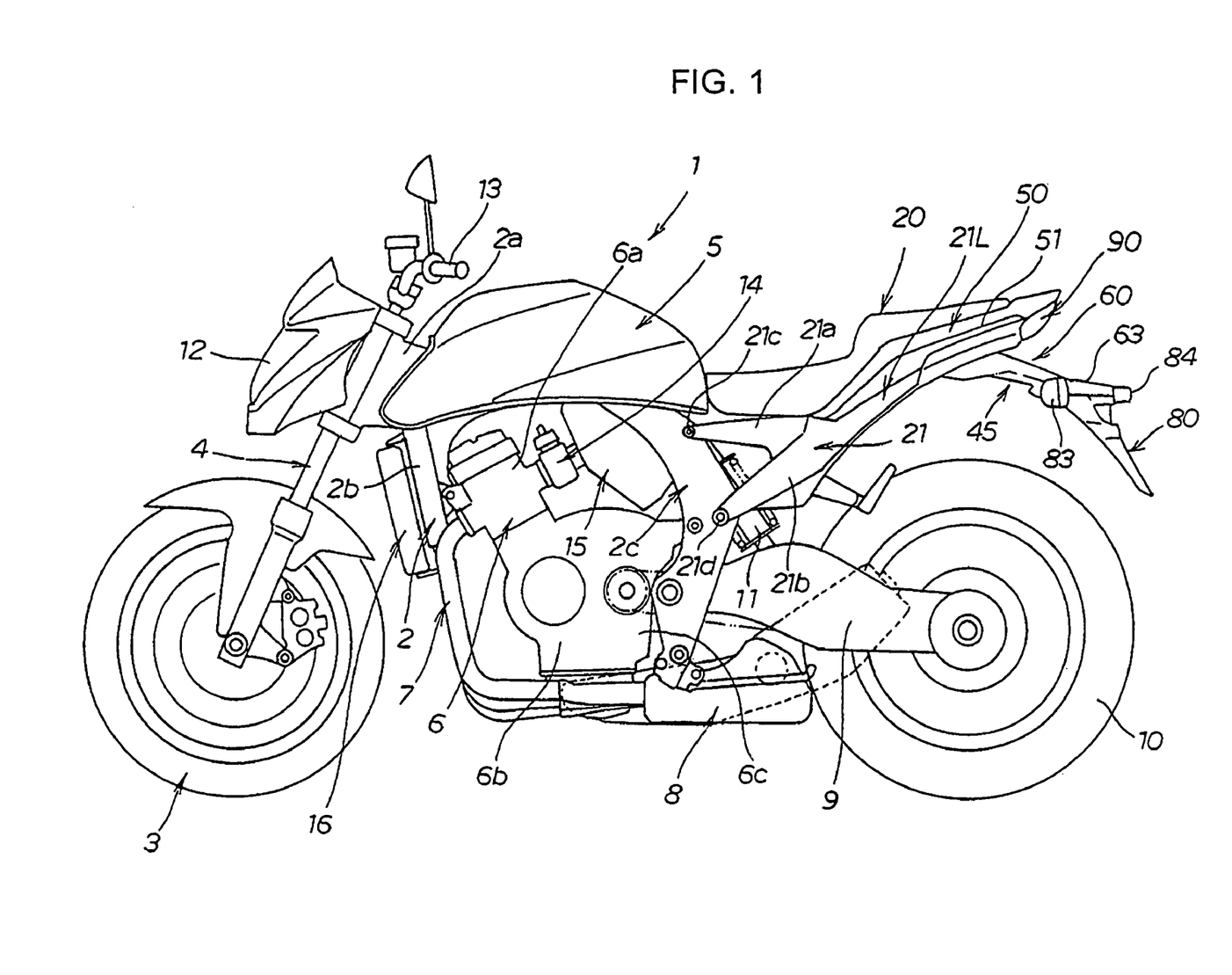
FIG. 1 is a schematic side view showing a motorcycle having a seat rail according to the present invention.

FIG. 1 is a schematic side view showing a motorcycle having a seat mounting structure having a seat rail according to the present invention. Referring to drawing, an outline of the motorcycle is described below.

In the motorcycle 1, a front wheel 3 is steerably supported by a head pipe 2a at a front end of a frame 2 via a front fork 4, a fuel tank 5 is arranged on the upside portion of a front half of the frame 2, a rear frame 2c is hung in an intermediate portion in a longitudinal direction of the motorcycle, an engine 6 is arranged between a down tube 2b and the rear frame 2c. The engine 6 is a water-cooled in-line four-cylinder engine having plural cylinders 6a thereof arranged inline parallel to a vehicle width direction.

Exhaust pipes 7 are extended forwardly, downwardly and then, rearwardly from the fronts of the cylinders 6a of the engine 6. An exhaust system 8 includes a muffler and a silencer arranged below a crankcase 6b and a transmission case 6c disposed at rear of the crankcase 6b.

A rear swing arm 9 extending rearwardly for supporting a rear wheel 10 is rockably supported at a lower half of the rear frame 2c. A rear cushion unit (shock absorber) 11 is disposed between the rear swing arm 9 and the upper portion of an intermediate portion of the rear frame 2c on the vehicle body side.

Further, as shown in FIG. 1, the motorcycle includes a headlight 12, a handlebar 13, a fuel supply equipment 14 such as a carburetor arranged at the rear of the cylinders 6a of the engine, an air cleaner 15, and a radiator 16.

A seat 20 extending rearwardly is arranged at rear of the fuel tank 5. The seat 20 is a tandem seat on which the rider and a pillion passenger can be seated in the longitudinal direction. The seat 20 is supported by the seat rail 21.

Figure 2:
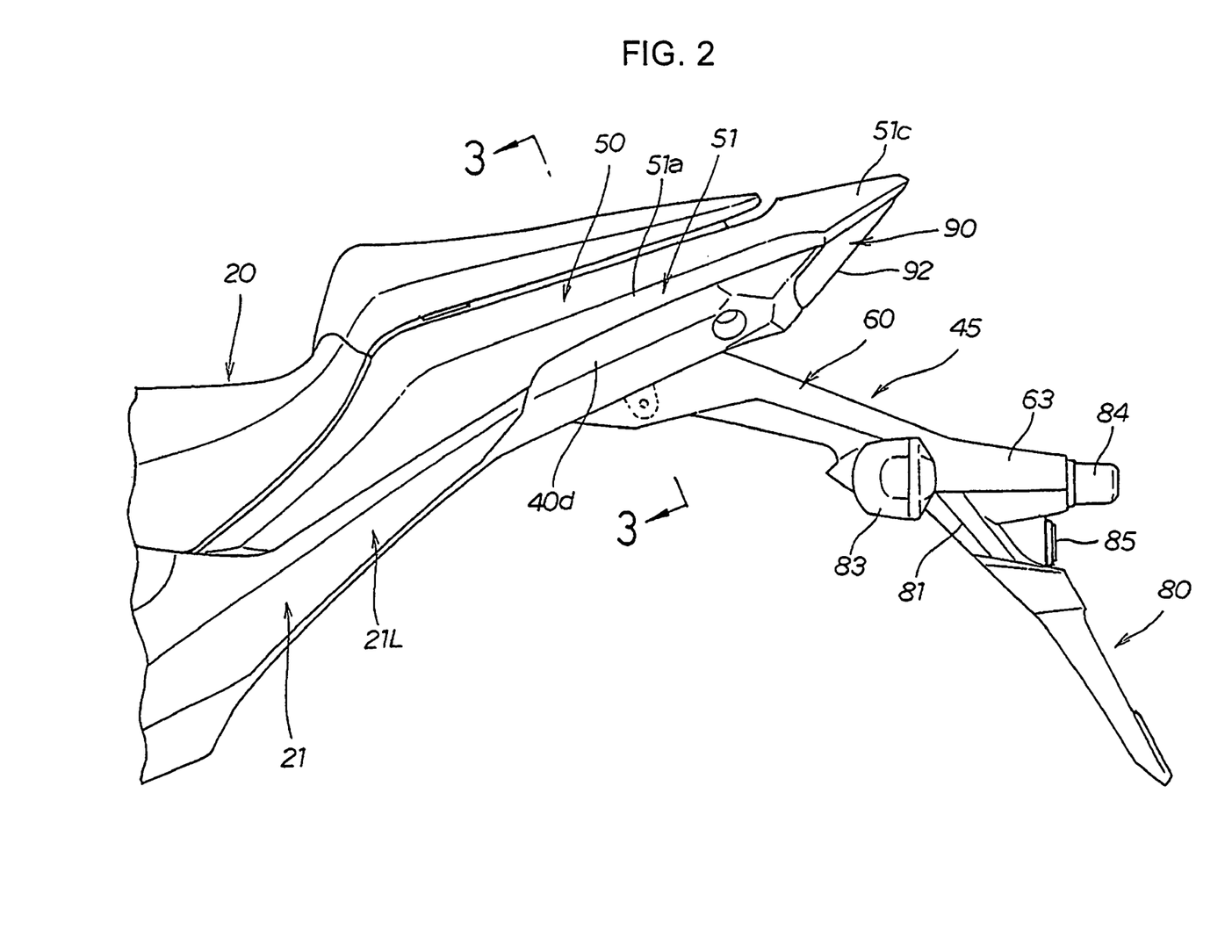
FIG. 2 is an enlarged side view showing a seat and a portion of the seat rail.
Figure 3:
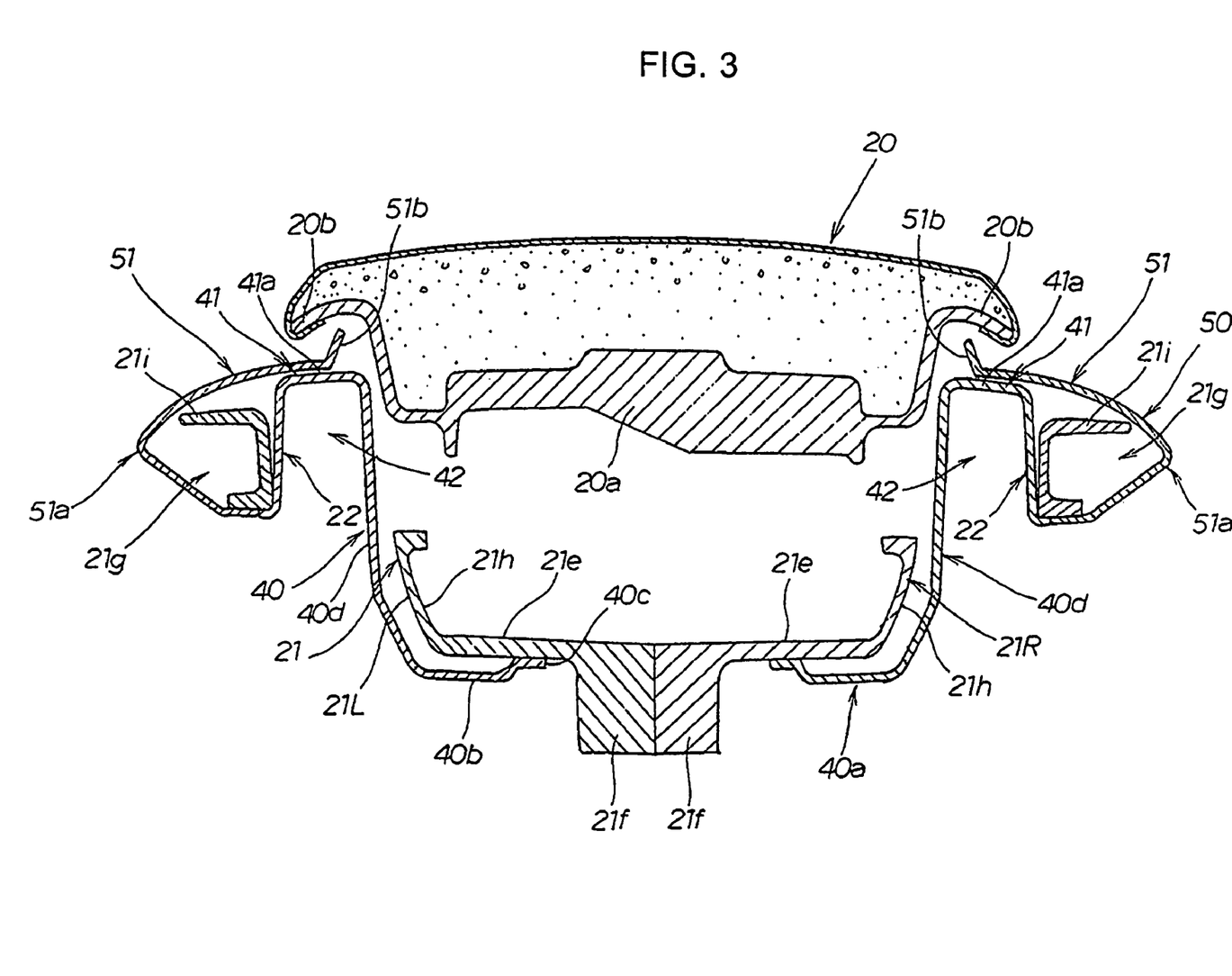
FIG. 3 is a sectional view as seen along a line 3-3 in FIG. 2.
Figure 4:
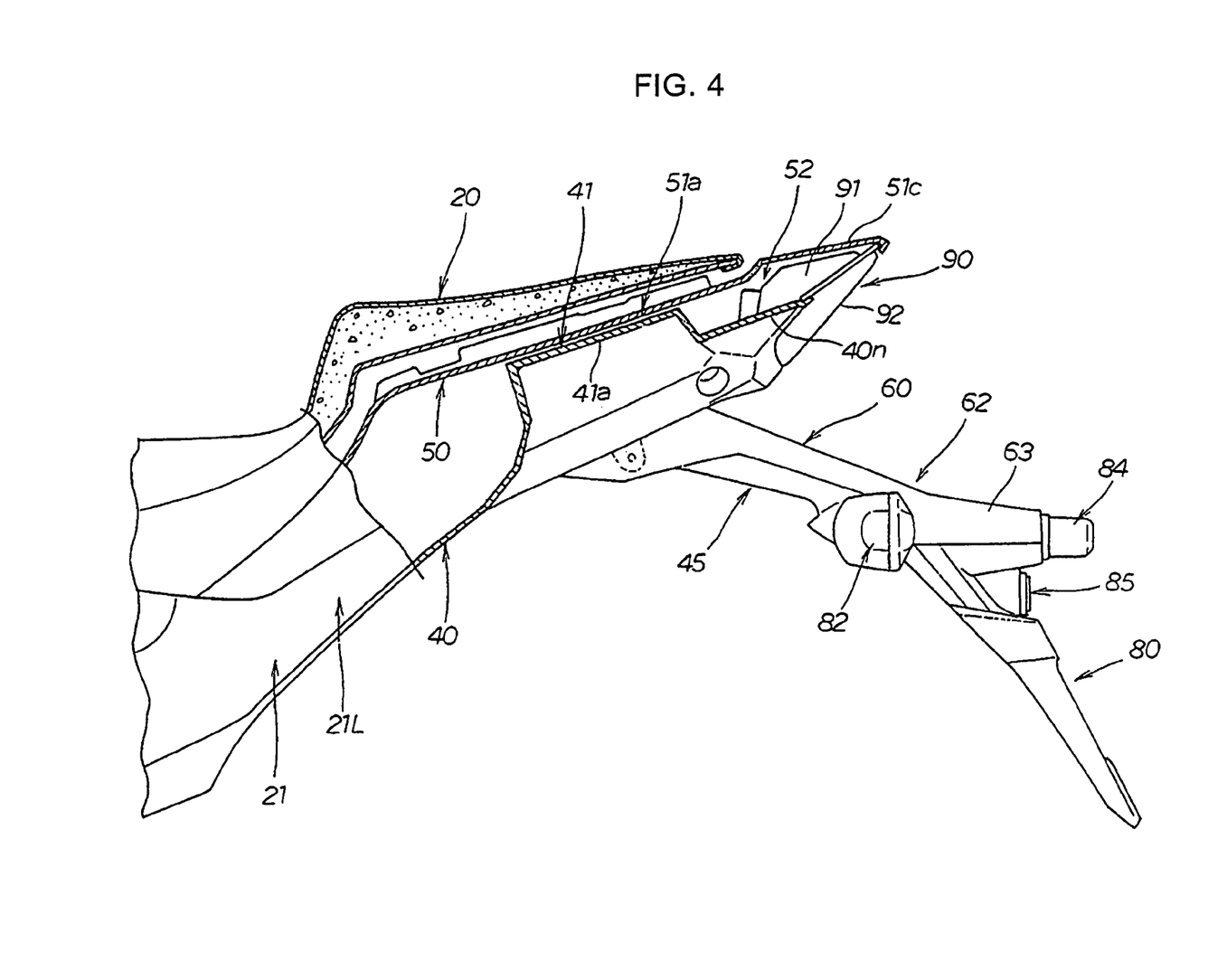
FIG. 4 is an enlarged side view showing the seat in which a main portion shown in FIG. 2 is illustrated.
Figure 5:
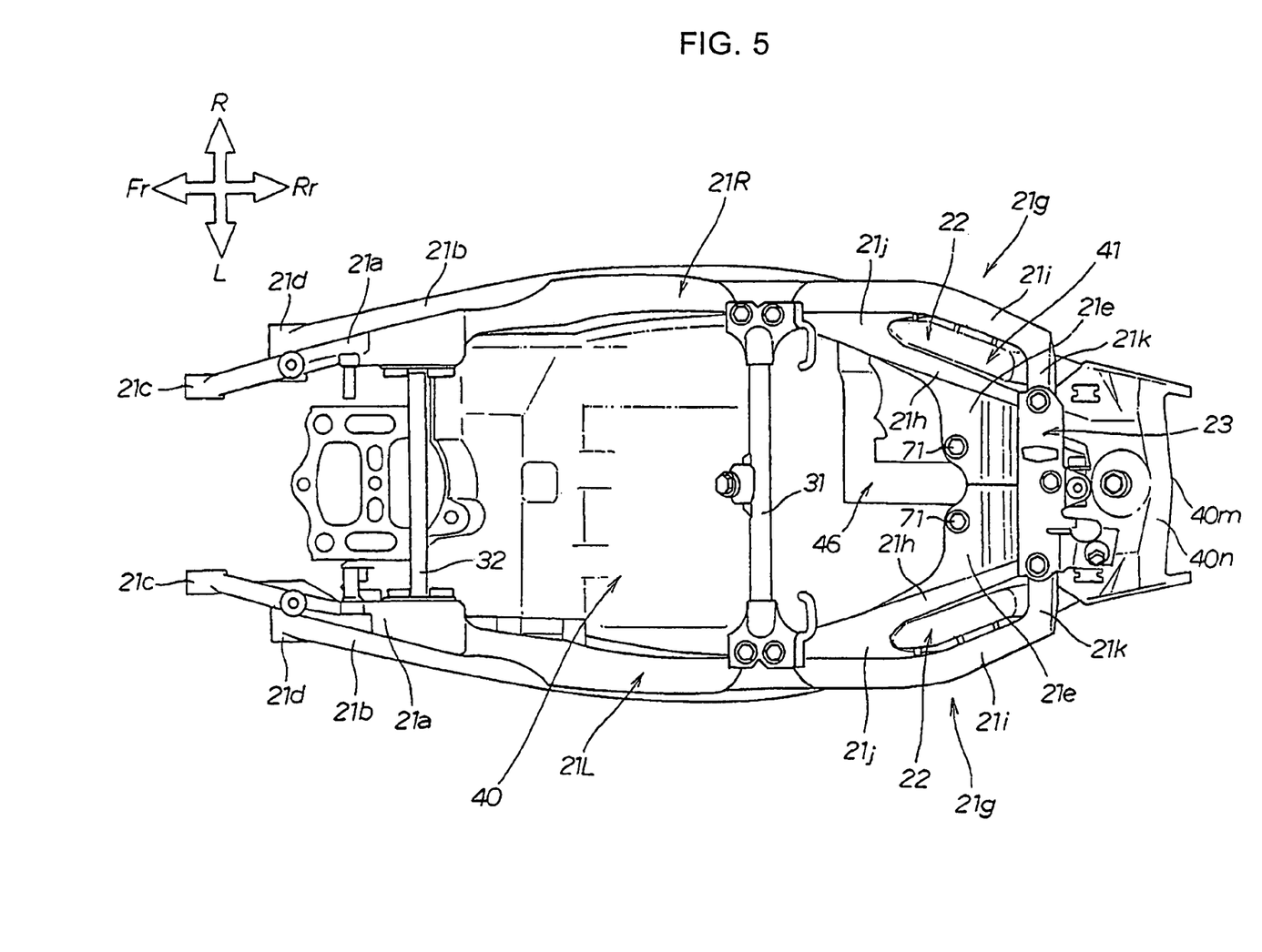
FIG. 5 is a top plan view showing the seat rail members shown in a state in which the seat is removed.
Figure 6:
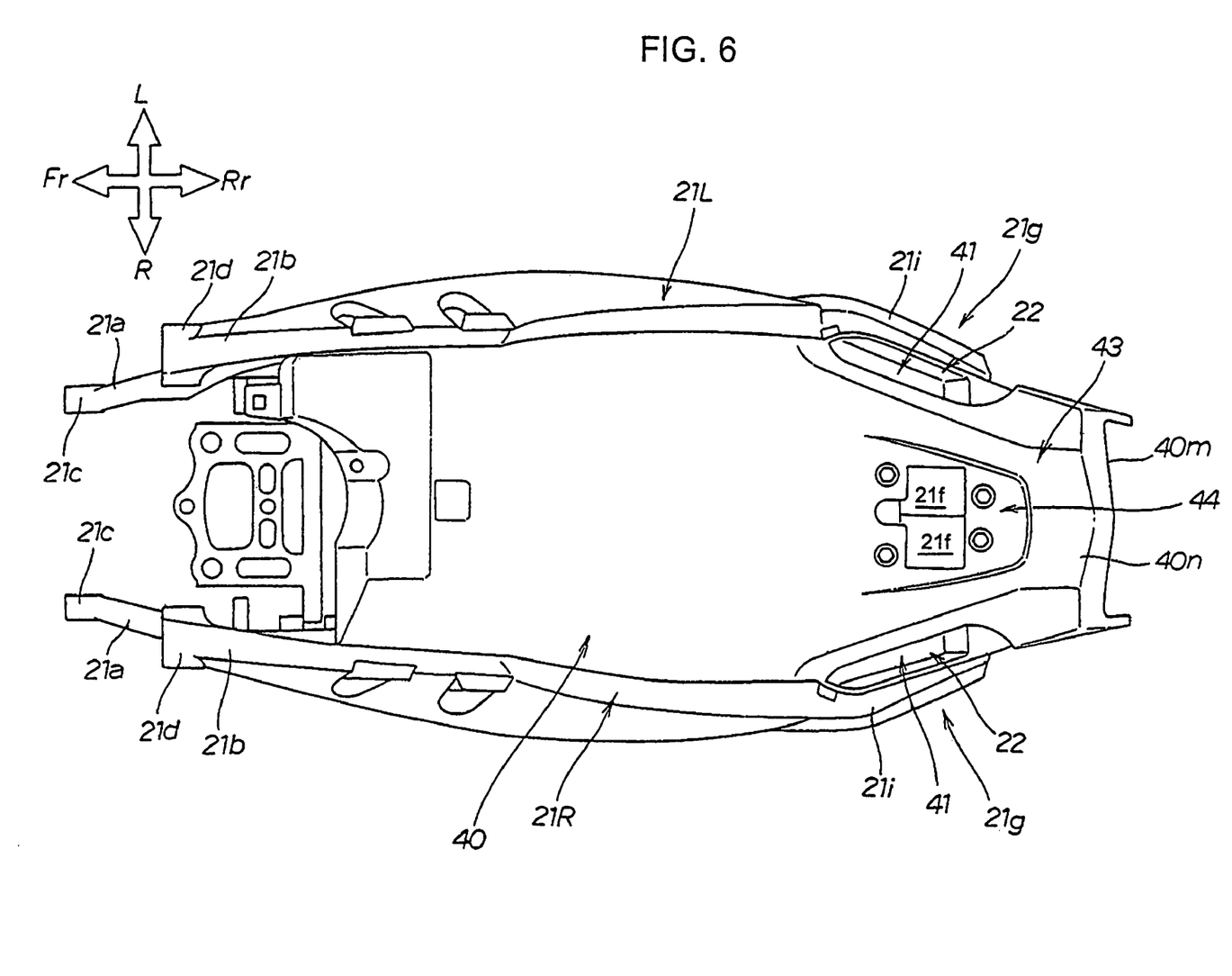
FIG. 6 is a bottom plan view showing the seat rail members.

FIG. 2 is an enlarged side view showing the seat, FIG. 3 is a sectional view as seen along a line 3-3 in FIG. 2, FIG. 4 is an enlarged side view showing the seat in a state in which a main portion shown in FIG. 2 is illustrated, FIG. 5 is a plan showing the seat rail from which the seat is removed, and FIG. 6 is a bottom plan view showing the seat rail viewed from the bottom.

The seat rail of the present invention is described below with reference to these drawings FIG. 2 through FIG. 6.

The seat rail 21 is provided as a supportive frame-like rail body including left and right rail members 21L, 21R. (see FIGS. 3, 5 and 6). The seat rail 21 is formed via casting, and may be made from a metal such as an aluminum alloy or other suitable alloys.

As shown in FIG. 1, a front end portion of each respective left and right seat rail member 21L, 21R is formed in a forked V-shape having upper and lower parts 21a, 21b, each of these parts being provided with respective mounting bosses 21c, 21d at the front end thereof.

The seat rail 21 is attached to and supported by upper and intermediate portions of the rear frame 2c via the front ends thereof at the mounting bosses 21c, 21d. Each seat rail member 21L, 21R extends upwardly and rearwardly from the frame at a generally upwardly inclined angle, as shown in FIG. 1.

The top plan view and the bottom plan view of the seat rail members 21L, 21R are shown in FIGS. 5 and 6, respectively. The rear of each of the left and right seat rail members 21L, 21R is provided with a platform section 21e. Each of the seat rail members 21L, 21R includes a central hanging section 21f (FIGS. 3, 6) at a rear portion thereof. The central hanging sections 21f extend downwardly from, and are integrally formed with the platform sections 21e. Inner abutting surfaces of the central hanging sections 21f are matched and fastened together.

Each of the seat rail members 21L, 21R is laterally branched rearwardly in the platform section 21e in the rear thereof adjacent the central hanging section 21f. Intermediate rear portions of the seat rail members 21L, 21R are connected by an intermediate cross member 31 installed between them, while intermediate front portions are connected by a front cross member 32 installed between them, and in this way, the left and right seat rail members 21L, 21R are integrated together to form the unified rail body.

Each of the left and right seat rail members 21L, 21R has a slotted side opening 22 formed therein. The slotted opening is upwardly formed from the outside in the vehicle width direction to the inside of the rear portion 21g of each left and right seat rail members 21L, 21R.

The slotted openings 22 are provided with a standing wall 21h extending upwardly at the respective outer edges of the platform sections 21e, and a symmetrical C-shaped side frame 21i located above and spaced apart from the corresponding standing wall 21h. Each of the slotted openings is located outwardly in a lateral direction on the respective rail members, and is open to the outside as shown in FIG. 3.

Each of the slotted openings 22 is formed on the seat rail members 21L, 21R to open upwardly. The slotted opening is formed between the respective left and right standing walls 21h and the left and right side frames 21i of the left and right seat rail members 21L, 21R.

As seen best in FIG. 3, each of the slotted openings 22 provides an opening (a hole) which extends substantially vertically and which includes a ceiling (closed portion) at upper end portion thereof. However, the slotted opening may be a groove or a notch having a ceiling at the crest, in place of the hole as described herein.

As shown in FIG. 5, frames 21j, 21k of the seat rail 21 surrounding the front and the rear portion of the slotted opening 22 are provided. Accordingly, each the slotted openings 22 is substantially in the shape of an ellipse surrounded by the side frame 21i in the lateral direction, surrounded by the standing wall 21h inside and surrounded by the frames 21j, 21k in its longitudinal direction.

In the illustrative embodiment, as shown in FIG. 5, a coupling plate 23 couples (joins) the frames 21k of the seat rail in the rear portion of the vehicle body.

A rear fender 40 is disposed between the bottom portions of each of the left and right seat rail members 21L, 21R. The rear fender surrounds (closes) a space between the bottom portions of each of the seat rail members 21L, 21R. The rear fender 40 is made of a plastic resin.

FIG. 5 shows a top face of the rear fender 40 and FIG. 6 shows a bottom plan view of the rear fender 40.

The rear fender 40 is integrated with convex portions 41 protruding upwardly on both sides on rear portion thereof. The convex portions 41 are fitted to the slotted openings 22 provided in the lateral direction in the rears of the seat rail members 21L, 21R. In other words, the rear fender 40 includes a pair of convex portions 41 formed at side portions thereof, and each of the convex portions 41 corresponds with a respective one of the slotted openings 22 of the seat rail members 21L, 21R.

FIG. 4 shows a protruded shape of the convex portions 41 formed in a lateral direction of the rear of the rear fender 40. The convex portions 41 extend in a longitudinal direction on the upside such that a (lateral) width thereof is shorter than its length. The convex portions 41 open downwardly and are protruded upwardly.

The convex portions 41 of the rear fender 40 are provided in the lateral direction of the rear of the rear fender 40, as described above. However, as clearly shown in FIG. 3, an opening 40c of the rear fender 40 is provided to a bottom plate 40b of a rear portion 40a of the rear fender 40. The central hanging sections 21f of the seat rail members 21L, 21R protrude downwardly through the opening 40c of the rear fender.

As further shown in FIG. 3, the right and left convex portions 41 of the rear fender 40 are fitted from the lower side thereof into the slotted openings 22 provided in the rear portions of the seat rail members 21L, 21R. The convex portions 41 close the slotted openings 22. Top faces 41a of the convex portions 41 close each upside, and void spaces 42 are formed opening downwardly in the rear fender 40.

The void space 42 opening downwardly is made slightly longer in its longitudinal direction than the width of a hand of a vehicle user, and the lateral width is made sufficient enough to receive all of the fingers of the hand in line.

A rear cowl 50 covers the sides of intermediate portions to rear halves of the left and right seat rail members 21L, 21R.

The rear cowl 50 is made of resin. The rear cowl includes overhanging portions 51 symmetrically protruding outside in a wedge-shaped cross-section in the lateral direction, as shown in FIG. 3.

A rear portion 51a of each overhanging portions 51 covers a substantial half of an outside face, a top face and a bottom of each symmetrical U-shaped side frame 21i open to an outside face of the rear of each seat rail 21L, 21R, and houses each U-shaped side frame 21i in wedge-shaped cross-sectional space.

The seat 20 is supported by the seat rail 21. The seat includes a bottom plate 21a, and right and left end portions 20b attached to the bottom plate 21a. The right and left end portions 20b of the bottom plate 20a are laid and supported on/by the seat rail members 21L, 21R. The right and left end portions 20b of the bottom plate 20a cover and conceal upwardly extending inner ends 51b of the rear cowl 50. The inner ends 51b are raised upwardly from the right and left overhanging portions 51 of the rear cowl 50.

As shown in FIG. 2, a vertical portion 40d of the rear fender 40 below a rear portion 51a of the overhanging portions 51 is a lower part of a side wall raised in the rear of the rear fender 40 (shown in FIG. 3).

Next, a rear structure including structure for mounting a fender stay on a rear end 43 of the rear fender 40 is described.

Figure 8:
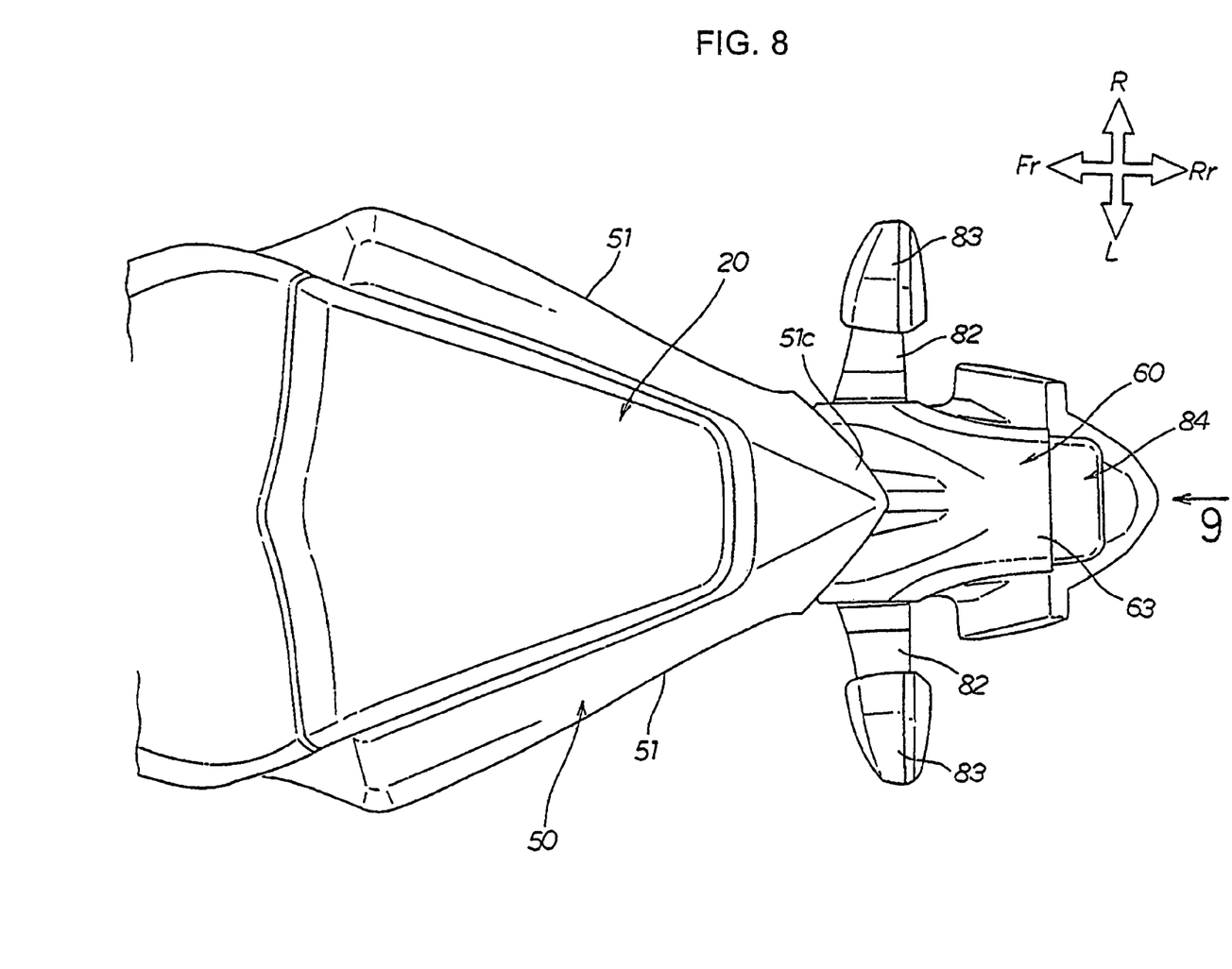
FIG. 8 is a top plan view showing a rear portion of the motorcycle including a rear portion of the seat.
Figure 9:
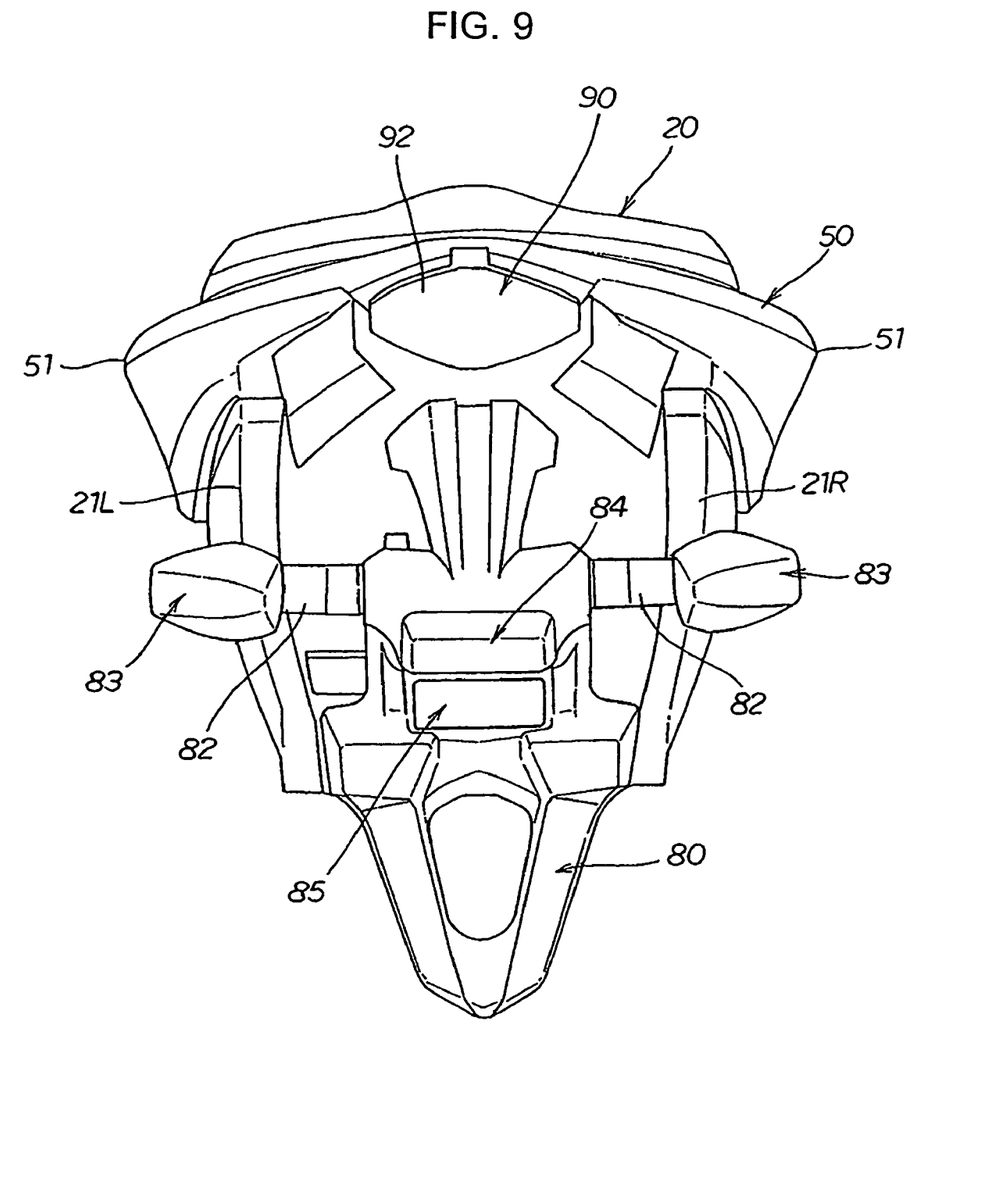
FIG. 9 is a view as seen from a direction shown by an arrow 9 in FIG. 8.

FIG. 8 is a plan view showing the rear of the motorcycle including the rear of the seat and FIG. 9 is a view as seen from a direction shown by an arrow 9 in FIG. 8.

Figure 7:
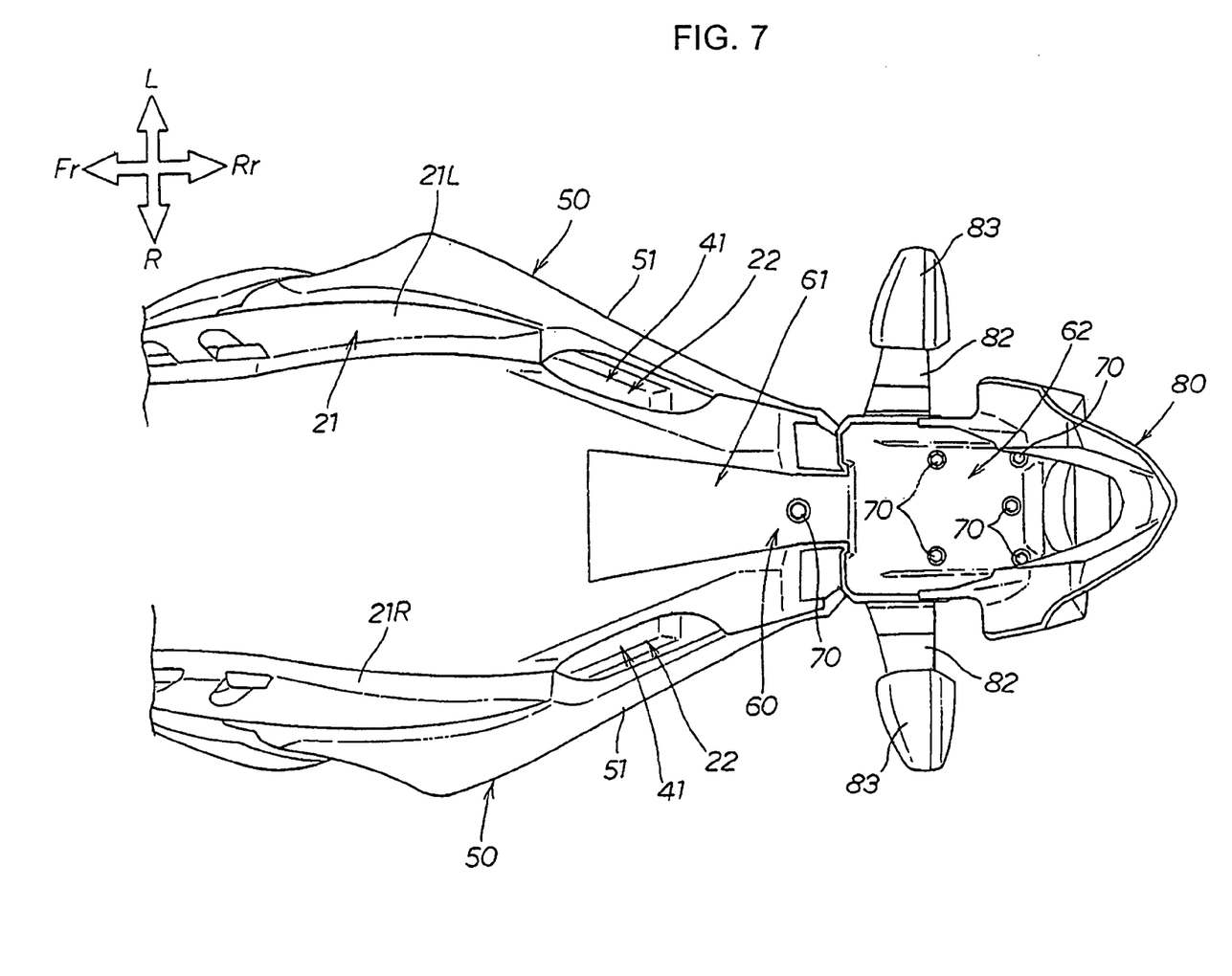
FIG. 7 is a bottom plan view showing seat rail members (portions thereof) including a rear fender, a fender stay and a license plate.

A front mounting portion 44, shown in the bottom plan view in FIG. 6, is provided to the rear of the rear fender 40. A front half 61 of a fender stay 60 is narrow and long in the longitudinal direction as shown in FIG. 7. The front half 61 of the fender stay 60 is fitted to a fitting member (not shown) and formed at the bottom of the rear of the rear fender 40 in the fitting member by inserting a fitting pawl and other required structures at its end. The rear of the front half 61 is connected, at a location of the center of the rear of the front half 61, to the rear of the rear fender 40 by a tapping screw 70.

A rear half 62 of the fender stay 60 is extended rearwardly of the rear fender 40 and rearwardly of the rear cowl 50 so as to form a tail 45 of the rear fender 40.

As shown in FIG. 7, the rear half 62 of the fender stay 60 is wider than the front half 61 thereof. A license plate 80 for mounting a license number plate is extended rearwardly and downwardly from the rear half 62 of the fender stay 60.

Accordingly, a rear half of a lower portion of the fender stay 60 is vertically divided into the rear half 62 of the fender stay and the license plate 80.

The rear half 62 of the fender stay and the license plate 80 are connected by tapping screws 70 as shown in FIG. 7.

Supporting arms 82 are extended outwardly in the lateral direction from the rear half 62 of the fender stay 60. Right and left rear blinker lights 83 are attached and supported by both sides of the vicinity of joining surfaces of a front half 81 of an upper portion of the license plate 80 and the rear 63 of the fender stay 60 (see FIG. 7).

A light 84 for irradiating the license plate 80 is housed and installed inside a rear face of a rear member 63 of the rear fender 60 such that a lens surface of the light 84 is directed rearwardly. A reflector 85 is provided on an upper portion of the license plate 80 immediately under the light 84.

The rear fender includes a curved-in portion 40*m* slightly concaving rearwardly in the longitudinal direction. The curved-in portion 40 *m* is formed on a rearmost member 40*n* of the rear fender 40 (see FIGS. 5 and 6). A rear end 51*c* of the rear cowl 50 is extended towards the circumference and upwardly of the curved-in portion 40*m* with the rear end opposite to the upside of the rearmost part 40*n* of the rear fender 40. A void space 52 is surrounded by the rear end of the rear cowl 50 (see FIG. 4).

A body including a lamp housing of a taillight 90 is housed in the void space 52. A lens 92 is exposed rearwardly with the lens turned rearwardly.

Lighting equipments such as the taillight 90, the right and left blinker lights 82, and the light 84 for irradiating the license plate are wired so that they are connected to a power source and control system through space surrounded by the rear fender 40, the rear cowl 50 and the seat 20 between the left and right seat rail members 21L, 21R or one side of the seat rail and the inside portion of the rear cowl 50.

As shown in FIG. 5, a lid 46 is provided at a rear portion of the rear fender 40. The lid 46 conceals the wiring of the taillight 90, the right and left blinker lights 82, and the light 84 for irradiating the license plate.

Figure 10:
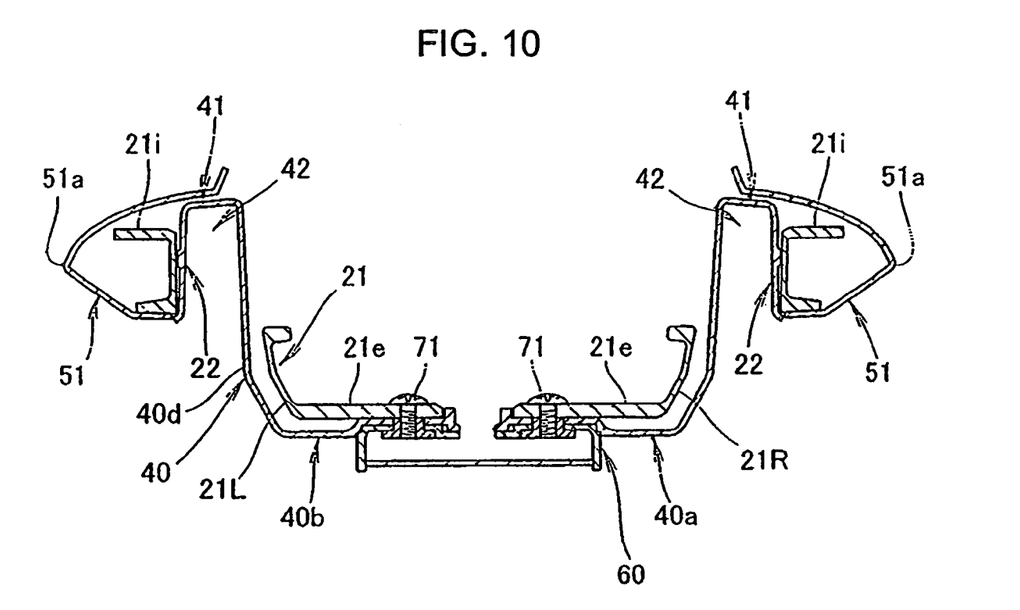
FIG. 10 is a sectional view showing a part at the rear of cross sectional view of the seat rail shown in FIG. 3.

A common connecting structure of the seat rail 21, the rear fender 40 and the fender stay 60 is discussed with reference to FIG. 10. The FIG. 10 is a sectional view showing rear in FIG. 3. FIG. 10 also shows a sectional view showing a portion including common bolts 71 shown in FIG. 5.

The common bolts 71 pierce the platform sections 21*e* of the left and right seat rail members 21L, 21R, the bottom plate 40*b* of the rear portion 40*a* of the rear fender 40. The rear fender 40 is overlapped under the platform sections 21*e*. The left and right portions of the fender stay 60 are overlapped under the bottom plate 40*b* via each stepped nut from upside portion.

In other words, the three features of the present invention, i.e., the platform sections 21*e* of the seat rail members 21L, 21R, the bottom plates 40*b* of the rear fender 40 and left and right portions of the fender stay 60, are fastened by the common bolts 71. Accordingly, since these three features (seat rail members 21L, 21R, the rear fender 40 and the fender stay 60) are connected and integrated by the common bolts 71, the number of parts required for assembling them can be reduced. Also, a man-hour required for assembly is reduced.

INDUSTRIAL AVAILABILITY

The seat rail according to the present invention includes seat rail members that support a tandem seat of a motorcycle. However, the seat rail of the present invention may be used for supporting a seat of other vehicles, such as an all-terrain vehicle.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle having a vehicle body frame, a seat rail assembly comprising a seat rail having a front end portion supported by and extending rearwardly from an intermediate portion of the vehicle body frame, said seat rail assembly comprising:
   a seat rail body including a left side portion and a right side portion each having a slotted opening formed therein at a rear portion thereof, said slotted opening extending inwardly and upwardly from an outer portion of each of the left and right side portions, respectively;
   right and left seat rail members; each of said right and left seat rail members having said slotted opening formed therein;
   a separately formed rear fender which is operatively attached to and supported by the right and left seat rail members, said rear fender having a pair of convex portions formed thereon, wherein one of said convex portions protrudes towards and corresponds to a respective slotted opening of the right and left seat rail members.

2. The seat rail assembly for the motorcycle according to claim 1, further comprising a rear cowl disposed at outer end portions of each of said right and left seat rail members;
   wherein, when viewed in a side view, the rear cowl covers the slotted openings of each of said right and left seat rail members at an outside portion thereof.

3. The seat rail assembly for the motorcycle according to claim 1, wherein, when viewed in a top view, the slotted opening of each of the right and left seat rail members is substantially elliptical in shape;
   and wherein the rear fender protectively covers a portion of the seat rail body proximate the slotted openings of said right and left seat rail members.

4. The seat rail assembly for the motorcycle according to claim 3, wherein a major axis of each of the substantially elliptical-shaped slotted openings is arranged along a vehicle length direction and a minor axis thereof is arranged along the vehicle width direction.

5. The seat rail assembly for the motorcycle according to claim 3, wherein the seat rail further comprises at least one crossmember extending between and interconnecting the right and left seat rail members;
   and wherein a part of said rear fender is disposed between outer bottom portions of said left and right seat rail members, and wherein said rear fender protectively covers a space between said outer bottom portions of each of the right and left seat rail members.

6. The seat rail assembly for the motorcycle according to claim 3, wherein a void space opening downwardly is formed in an underside of each of said convex portions, and wherein said void space is configured to receive a hand of a vehicle user.

7. The seat rail assembly for the motorcycle according to claim 1, wherein said rear fender is formed of a plastic resin material.

8. A seat mounting structure for a motorcycle having a vehicle body frame, said seat mounting structure comprising
   a pair of seat rail members, each of said seat rail members having a front end portion supported by and extending rearwardly from an intermediate portion of the vehicle body frame; and
   each of said seat rail members having a slotted opening formed therein at a rearwardly portion thereof, said slotted opening extending inwardly and upwardly from an outer portion of each of the seat rail members,
   wherein the seat mounting structure further comprises a separately formed rear fender which is operatively attached to and supported by the right and left seat rail members, said rear fender having a pair of convex portions formed thereon; and wherein one of said convex portions protrudes towards and corresponds to a respective slotted opening of one of the right and left seat rail members.

9. A seat mounting structure for a motorcycle according to claim 8, further comprising a rear cowl disposed at outer end portion of the each of seat rail members; wherein when viewed in a side view, the slotted openings of each of said seat rail members at an outside portion thereof is covered by said rear cowl.

10. A seat mounting structure for a motorcycle according to claim 8, wherein, when viewed in a top view, the slotted opening of each of the seat rail members is substantially elliptical in shape; and each of the convex portions of the rear fender protectively covers a respective one of the slotted openings of said seat rail members.

11. A seat mounting structure for a motorcycle according to claim 8, wherein a major axis of the substantially elliptical-shaped slotted opening is arranged along a vehicle length direction and a minor axis of the substantially elliptical-shaped slotted opening is arranged along the vehicle width direction.

12. A seat mounting structure for a motorcycle according to claim 8, wherein a void space opening downwardly is formed in an underside of each of said convex portions, and wherein said void space is configured to receive a hand of a vehicle user.

13. A motorcycle comprising
a vehicle body frame; and
a seat mounting structure;
said seat mounting structure comprising
a left seat rail member and a right seat rail member, each of said left and right seat rail members having a front end portion thereof supported by an intermediate portion of the vehicle body frame, wherein said seat rail members extend rearwardly from the intermediate portion of the vehicle body frame;
each of said left and right seat rail members having a slotted opening formed thereon at a rearwardly portion thereof, said slotted opening being formed inwardly and upwardly from an outer portion of each of the left and right seat rail members in a vehicle width direction; and
a rear fender separately formed between said left and right seat rail members, said rear fender being supported by each of the left and right seat rail members;
wherein said rear fender having a pair of convex portions formed thereon which protrude towards respective one of said slotted openings of the seat rail members; and
each of said convex portions of the rear fender corresponds to respective one said slotted openings of the left and right seat rail members.

14. A motorcycle according to claim 13, further comprising a rear cowl disposed at outer end portions of the each of the left and right seat rail members; wherein when viewed in a side view, each of the slotted openings of said seat rail members at an outside portion thereof is covered by said rear cowl.

15. A motorcycle according to claim 13, wherein, when viewed in a top view, the slotted openings of each of the seat rail members is substantially elliptical in shape; and each of the convex portions of the rear fender surrounds respective one of the substantially elliptical-shaped slotted openings of said left and right seat rail members.

16. A motorcycle according to claim 13, wherein a major axis of each of the substantially elliptical-shaped slotted openings is arranged along a vehicle length direction and a minor axis thereof is arranged along the vehicle width direction.

17. A motorcycle according to claim 13, wherein
said rear fender is disposed between outer bottom portions of said pair of seat rail members, and wherein said rear fender surrounds a space between the outer bottom portions of each of the left and right seat rail members;
wherein when each of the convex portions of the rear fender surrounds respective one of the substantially elliptical-shaped slotted openings of said left and right seat rail members, a void space opening downwardly is formed in slotted opening of each of said left and right seat rail members, and wherein said void space is configured to receive a hand of a vehicle user; and
wherein said rear fender is formed of material having resin.

* * * * *